Figure 1:
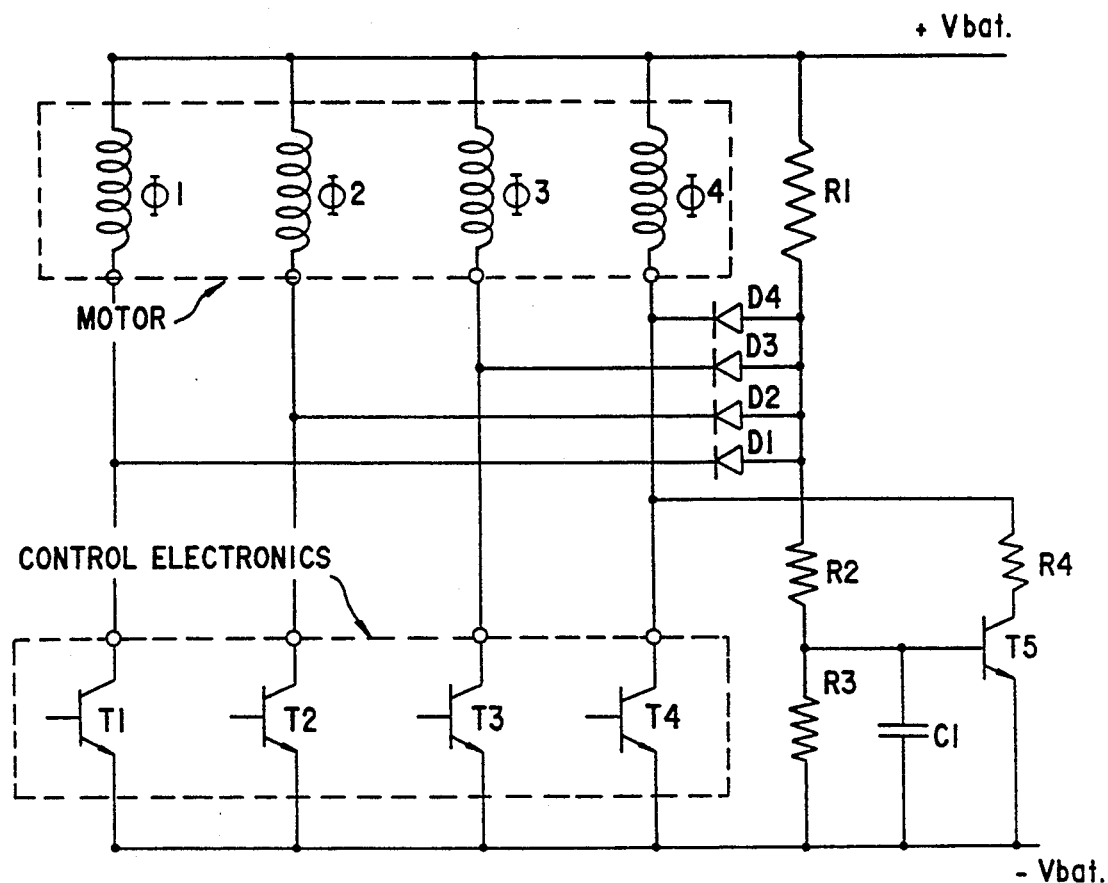

United States Patent [19]

Loncle et al.

[11] Patent Number: 5,304,910
[45] Date of Patent: Apr. 19, 1994

[54] DEVICE FOR CONTROLLING THE ELECTRICAL POWER SUPPLY OF A STEPPING MOTOR AND STEPPING MOTOR EQUIPPED WITH SUCH A DEVICE

[75] Inventors: Jean-Pierre Loncle, Muret; Michel A. Pournain, Leguevin, both of France

[73] Assignee: Siemens Aktiengesellschaft, Munich, Fed. Rep. of Germany

[21] Appl. No.: 916,135

[22] PCT Filed: Jan. 25, 1991

[86] PCT No.: PCT/EP91/00149
§ 371 Date: Jul. 27, 1992
§ 102(e) Date: Jul. 27, 1992

[87] PCT Pub. No.: WO91/11851
PCT Pub. Date: Aug. 8, 1991

[51] Int. Cl.$^5$ ............................................... H02P 8/00
[52] U.S. Cl. ..................................... 318/696; 318/685
[58] Field of Search ................................... 318/685, 696

[56] References Cited
U.S. PATENT DOCUMENTS

| | | |
|---|---|---|
| 4,730,164 | 3/1988 | Daido et al. |
| 4,868,478 | 9/1989 | Hedlund et al. ............... 318/696 |
| 5,034,674 | 7/1991 | Sato ............................... 318/696 |
| 5,103,151 | 4/1992 | Kondo et al. .................. 318/696 |

FOREIGN PATENT DOCUMENTS

| | | |
|---|---|---|
| 0341659 | 11/1989 | European Pat. Off. |
| 59-072997 | 4/1984 | Japan. |
| 61-135395 | 6/1986 | Japan. |
| 62-126898 | 6/1987 | Japan. |

*Primary Examiner*—William M. Shoop, Jr.
*Assistant Examiner*—Karen Masih
*Attorney, Agent, or Firm*—Herbert L. Lerner; Laurence A. Greenberg

[57] ABSTRACT

The device comprises transistors (T1, T2, T3, T4) each connected in series with one of the phases ($\phi 1$, $\phi 2$, $\phi 3$, $\phi 4$) of the stator of the motor in order to control its power supply by an electrical energy source ($+V_{BAT}$). Means (D1, D2, D3, D4) are provided for detecting the simultaneous stopping of conduction in all of the phases and to then control the return to conduction of one of the phases ($\phi 4$), by an appropriate control of a transistor (T5), in order to lock the rotor with a predetermined holding torque established by this phase. Thus, in the case of a failure of the control of the phases of the motor, the motor remains substantially immobile even if it is subject to the action of a parasitic or resisting torque.

Application to a motor for controlling the butterfly valve for the gases of an internal combustion engine.

15 Claims, 4 Drawing Sheets

DEVICE FOR CONTROLLING THE ELECTRICAL POWER SUPPLY OF A STEPPING MOTOR AND STEPPING MOTOR EQUIPPED WITH SUCH A DEVICE

The present invention relates to a device for controlling the electrical power supply of a stepping motor, more particularly, to such a device designed for a stepping motor whose stator comprises a plurality of p ed in series with an electrical energy source and a transistor for controlling the electrical power supply of that phase, the power supply of the phases being sequentially and cyclically controlled in order to make the rotor of the motor turn step by step. The invention also relates to a stepping motor equipped with such a device.

When all the phases of such a stepping motor stop being supplied, its rotor stops turning and should normally stop in the last commanded position. This is the case in particular if the motor shaft is not subject to any torque of external origin, or if this torque is less than the "rest moment" of the stepping motor. This rest moment, due to a reluctance effect, corresponds to the torque which has to be applied to the motor shaft in order to make it turn continuously in the absence of any excitation of the windings and of any other torque of external origin on this shaft.

If the torque of external origin is greater than the rest moment, the accidental or deliberate cutting of f of the power supply of the phases of the stator is followed by a rotation of the rotor up to a position which is defined, for example, by a stop.

At the present time the use of a stepping motor is envisaged for controlling an actuator such as the butterfly valve adjusting the intake of air for an internal combustion engine driving a motor vehicle.

In this respect, there is known from the French Patent Application No 8806363 of the 11th May 1988, lodged in the name of BENDIX ELECTRONICS SA, a device for controlling the air intake butterfly valve of an internal combustion engine which comprises an electric motor whose stator is mechanically coupled to an accelerator pedal while the rotor of this motor is connected to the butterfly valve by a friction coupling device. An excitation of the motor causes a rotation of the rotor with respect to the stator, which allows the reduction, by a predetermined angle, of the opening of the butterfly valve in order to adjust the speed of the vehicle or, in detecting the imminence of a skidding of the wheels, to avoid this skidding by reducing the driving torque supplied to these wheels.

When it is envisaged, as in the abovementioned Patent Application, to correct the position of the butterfly valve using a motor, it is observed that in the case of the failure of the motor, an external torque applied to the butterfly valve could modify, possibly in an erratic manner, the position of the latter. Such a torque could result, for example, from turbulence in the air intake manifold. The erratic variations in the position of the butterfly valve which are observed are therefore capable of seriously affecting the stability of the engine speed. In such a situation, it is desirable that the butterfly valve should remain in the position adjusted at the moment of the failure, its controls then being able to be provided conventionally by the accelerator pedal of the vehicle by means of the mechanical coupling of this pedal with the stator of the motor, as described for example in the abovementioned Patent Application.

In order to achieve this result, it is possible to consider inserting a friction coupling device between the butterfly valve and a fixed reference surface. This friction coupling device is dimensioned in order to introduce a friction torque greater than the interfering torque which could be applied to the butterfly valve in the case of a failure of the motor, and less than the torque supplied by this motor when the latter is functioning normally. This solution is not without disadvantage. In fact, the motor must overcome an additional "dry" frictional torque each time it is actuated and must therefore be oversized in consequence.

A second solution consists in inserting an electromagnetically controlled friction clutch between the butterfly valve and a fixed reference device, this clutch being actuated when the motor fails. This solution is no more satisfactory as a large amount of energy is necessary in order to maintain such a clutch disengaged during normal operation.

A similar solution but one which consumes less energy consists in using an electromagnetic positive clutch. This solution also has a disadvantage. If reference is made to the device described in the above-mentioned Patent Application, it is observed that a friction coupling device is interposed between the butterfly valve and the rotor of the motor. Thus, when the driver operates the accelerator pedal in order to modify the angle of opening of the butterfly valve thus proposing a "commanded" value for this angle, this friction coupling effectively allows the transmission of the command, from the stator to the butterfly valve, by a slipping in the friction coupling device, this slipping being caused by a coupling of two stops which are respectively integral with the stator and with the spindle of the butterfly valve. The interposition of an electromagnetic dog clutch, as envisaged above, prevents such a slipping, which is necessary for the correction of a possible deviation in the position of the butterfly valve controlled by the motor, with respect to the command determined by the driver.

The purpose of the present invention is therefore to produce a device for controlling the power supply of a stepper motor capable of ensuring the holding in position of the rotor of the motor in the case of an accidental break in the control of the phases of the motor, despite the existence of an external parasitic torque acting on this rotor, this device not having any of the abovementioned disadvantages of other devices which can be used for this purpose.

Another purpose of the present invention is to produce such a device which does not depend on any mechanical coupling and which has no effect on the normal functioning of the motor and of a device actuated by this motor.

Another purpose of the present invention is to produce such a device which allows the correction of a deviation between this device and a device defining a commanded position for the latter.

Another purpose of the present invention is to produce such a device allowing an electrical power supply, using pulse width modulation, of the windings of the stepping motor.

These purposes of the invention, together with others which will appear in the rest of the present description, are achieved with a device for controlling the electrical power supply of a stepping motor, of the type comprising a plurality of switches each controlling the power supply by an electrical energy source of one phase of the stator of the motor, this device being characterized in that it comprises means for detecting the simultaneous stopping of conduction in all of the phases and means excited by these detection means in order to control the restarting of conduction of one of the phases, in such a way as to lock the rotor of the motor with a predetermined holding torque established by this phase.

According to the present invention, the means for controlling the restarting of conduction of the phase generating the holding torque comprise a holding transistor whose emitter-collector circuit is connected in series with this phase, in parallel with the emitter-collector circuit of the transistor which normally controls the power supply of the said phase, the detection means controlling the base of the holding transistor.

According to one embodiment of the invention, the detection means are constituted by a plurality of diodes each connected between an output terminal of a phase of the stator and an end terminal of a dividing bridge whose mid point is connected to the base of the holding transistor, the plurality of diodes constituting a hard wired AND function logic gate sensitive to the simultaneous absence of current in all of the phases in order to establish on the mid point of the dividing bridge a voltage which triggers the conduction of the holding transistor and therefore of the electrical power supply of the holding phase to which this transistor is connected.

According to a variant of the device according to the invention, more particularly adapted to a power supply to the phases of the stator of the motor by pulse width modulation, a filtering circuit is interposed between the output of the detection means and the base of the holding transistor in order to prevent erratic triggerings of the conduction of the holding transistor.

Figure 2:
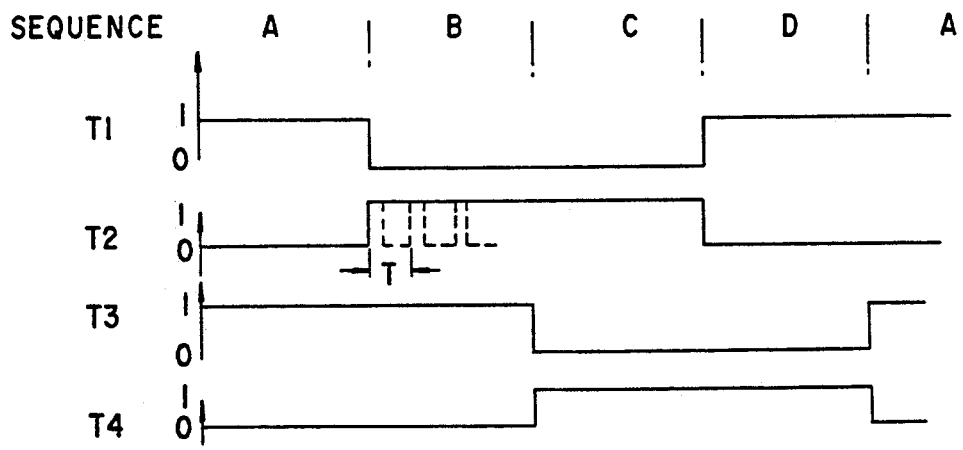
Figure 3:
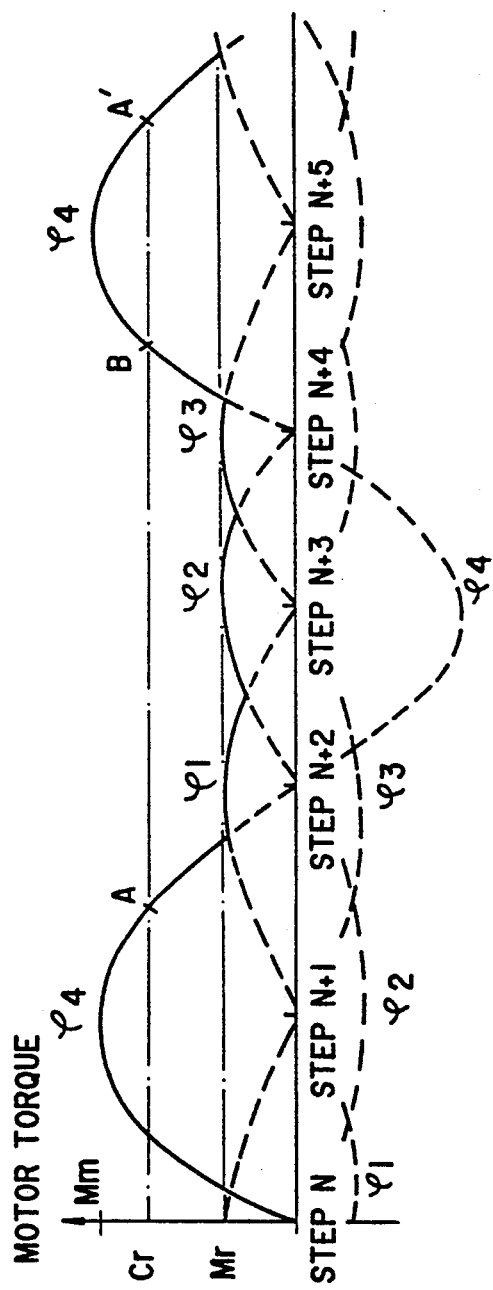
Figure 4:
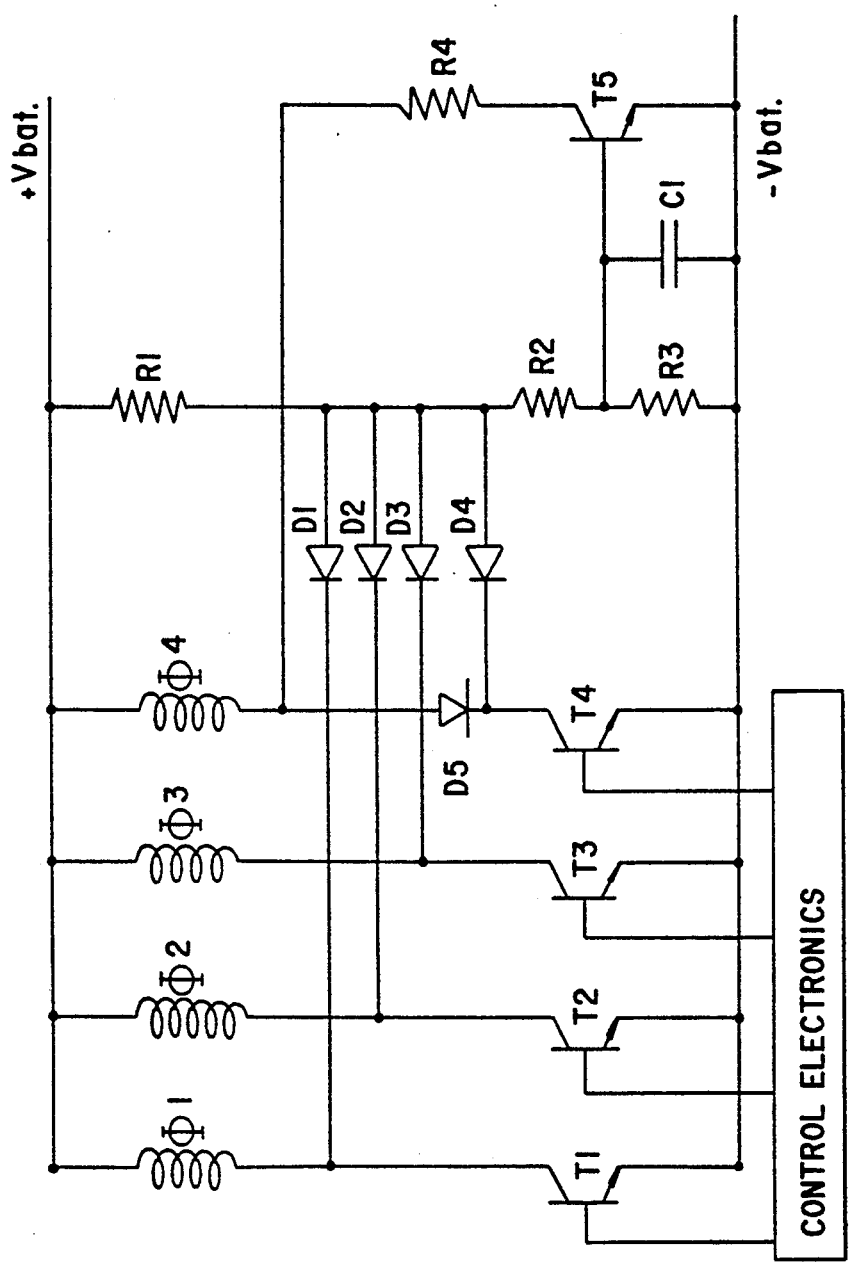
Figure 5:
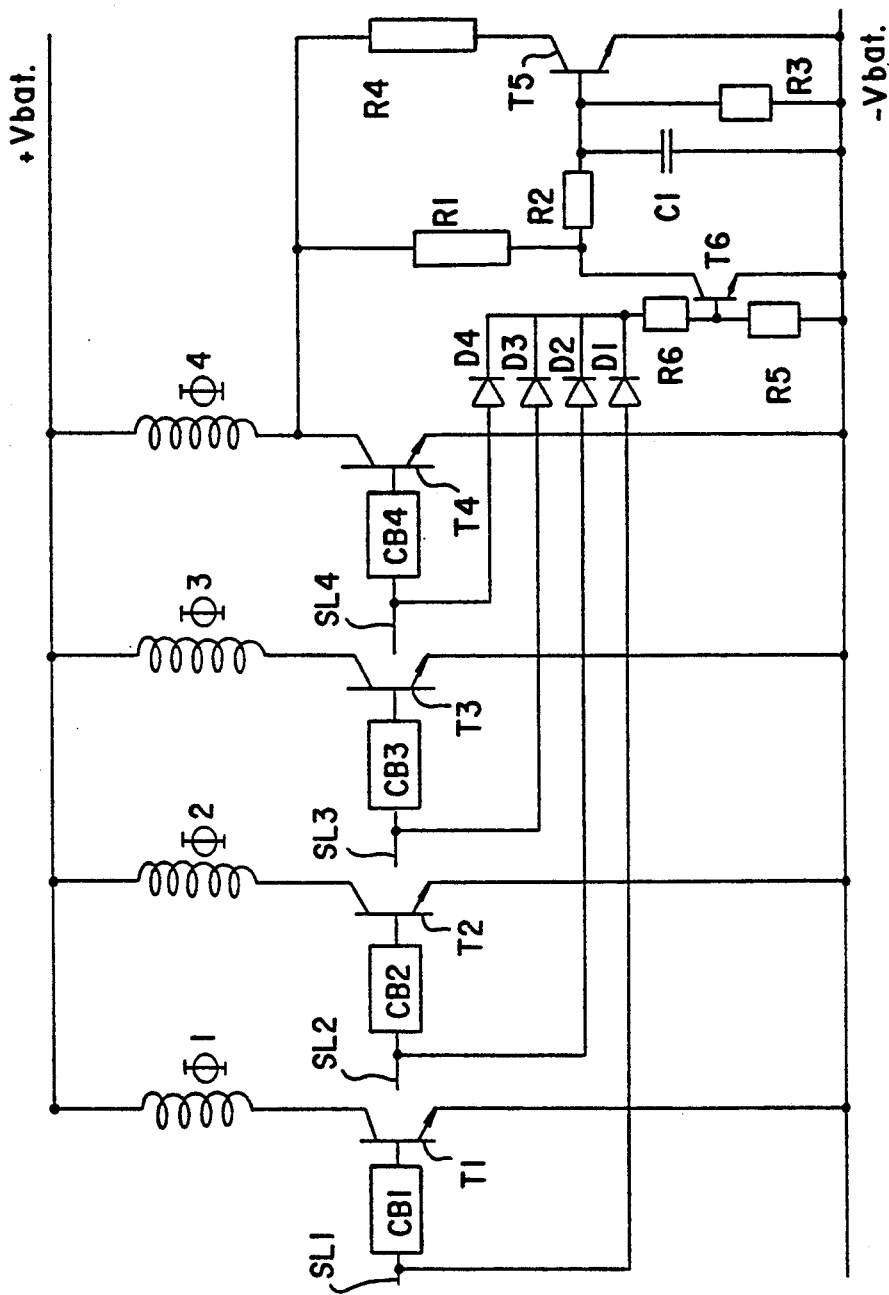

Other characteristics and advantages of the device according to the invention will appear on reading the following description and on examining the appended drawing in which:

FIG. 1 is a circuit diagram of a first embodiment of the device according to the invention, FIG. 2 shows timing diagrams of the power supply of the different phases of the stepping motor controlled by the device according to the invention, FIG. 3 is a graph useful in the explanation of the establishment of a holding torque obtained by means of the device according to the invention, FIG. 4 is a circuit diagram of a second embodiment of the device according to the invention and, FIG. 5 is a circuit diagram of a third embodiment of the device according to the invention.

It is known that a stepping motor, whether it is of the permanent magnet type, the variable reluctance type or of a type resulting from the combination of the two preceding types, comprises a stator on the pole pieces of which are wound windings divided into several phases, four for example, which are independently and separately supplied. The successive windings which are found on the periphery of the stator each belong to a predetermined phase, according to an arrangement which is repeated every four steps, in the case of a four phase winding ($\Phi 1$, $\Phi 2$, $\Phi 3$, $\Phi 4$) such as the one shown in FIG. 1 of the appended drawing. In the rest of the description "phase" will refer to a set of windings connected in series.

The movement of the rotor of the motor into several successive positions or "steps" is obtained by a sequential supply of predetermined phases. It is assumed that, conventionally, switches constituted for example by power transistors (T1, T2, T3, T4) control the supply of each phase by an electrical energy source $+V_{BAT}$. Control electronics, which can be physically separate from the motor or built into it, distribute control signals to the bases of the transistors T1, T2, T3, T4, according to a predetermined repetitive sequence. The timing diagrams of FIG. 2, by way of example only, show such a possible and very simple sequence of excitation of phases by means of the bases of these transistors. In this figure the 0 and 1 levels respectively correspond to the off and conducting states of a particular transistor. Thus, for example, during step A of a sequence A-B-C-D of states of the transistors T1, T2, T3, T4, the transistors T1 and T3 control the supply of the phases $\Phi 1$ and $\Phi 3$ while the transistors T2 and T4, being off, prevent the supply of the phases $\Phi 2$ and $\Phi 4$. The sequence A-B-C-D shown in FIG. 2 is repeated every four steps, in order to make the rotor of the motor successively move into the positions N, N+1, N+2, N+3, the sequence then repeating so that a new step A brings the rotor into position N+4, etc....

It is also known that a stepping motor which is not supplied nevertheless opposes the rotation of its rotor with a torque called the "rest" torque resulting from a reluctance effect. FIG. 3 shows this rest torque $M_R$ which varies according to sinusoidal arcs centred over the successive steps such as the steps n+2, N+3, N+4 shown in FIG. 3. This rest torque is commonly in the order of 10 to 15% of the torque delivered by the motor, when the latter is supplied.

When the power supply of the motor is cut off, this torque is therefore capable of opposing a rotation of the rotor if any parasitic or resisting torque is applied to the shaft or the rotor of if the torque thus applied is less than the torque $M_R$.

In practice however, in a stepper motor with a mechanical device mechanically coupled to its rotor constituting an "actuator" which must overcome forces applied to this mechanical device, it often happens that the latter transmits to the rotor a parasitic or resisting torque $C_R$ which is greater than $M_R$. If therefore the motor is not supplied, there will be a rotation of the rotor. Such a rotation modifying the position of the mechanical device can prove detrimental, particularly when the cutting off of the power supply is accidental. In the application described in the preamble of the present description to the control of the butterfly valve of the air intake of an internal combustion engine, such a variation could cause a sudden variation in the speed of the engine.

According to the present invention, in the case of a failure in the power supply of the motor, the rotor is prevented from turning by re-supplying one of the phases whose power supply had been previously cut off, this supply being adjusted such that the re-supplied phase opposes the rotation of the rotor with a position holding torque $M_M$ (see FIG. 3) which exceeds any parasitic or resisting torque $C_R$ which could otherwise displace the rotor from the position which it occupied at the moment of the failure.

Reference is made to FIG. 3, assuming that at the moment of the failure the rotor occupied an angular position between those corresponding to the steps N+1 and N+5. If a torque less than $M_R$ is then applied to the rotor by external agents, the rest torque $M_R$ of the motor alone suffices to oppose any displacement of the rotor.

If, on the other hand, as shown in FIG. 3, the torque $C_R$ is greater than $M_R$, but less than $M_M$, the motor will be able to turn through several steps under the action of the torque $C_R$, but only as long as the angular position reached does not correspond to the points A or B of the graph of the holding torque established by the phase $\phi 4$, where this torque reaches the value $C_R$. It is therefore clear that the displacement of the rotor to a stable equilibrium position does not exceed two steps, in either direction, two consecutive maxima of $M_M$ being separated by four steps. Present stepping motors commonly achieve a resolution of several hundred steps, the displacement of the rotor after the failure being limited to a few degrees, which is sufficient in many applications to avoid substantially interfering with the system controlled by an actuator driven by such a motor.

Reference is again made to FIG. 1 in order to explain the structure and functioning of the device according to the invention. As seen above, this device comprises transistors T1, T2, T3, T4, the emitter-collector circuit of each transistor being connected in series with a phase $\phi 1$, $\phi 2$, $\phi 3$, $\phi 4$, respectively, of a stepping motor, the other terminal of the phase being connected to an electrical energy source $+V_{BAT}$. The other terminal of the emitter-collector circuit of each of the transistors is connected to ground or to the $-V_{BAT}$ terminal of a battery constituting the electrical energy source, as is the case when such a motor is part of an actuator installed in a motor vehicle. Three resistors R1, R2, R3 are connected in series between a line at $+V_{BAT}$ and a line at $-V_{BAT}$. Four diodes D1, D2, D3, D4 are respectively connected between a terminal of a phase $\phi 1$, $\phi 2$, $\phi 3$, $\phi 4$ respectively common with the associated transistor T1, T2, T3, T4 and the terminal common to the resistors R1, and R2. As will be seen below, these four diodes thus connected constitute means of detection of a simultaneous absence of current in the phases $\phi 1$, $\phi 2$, $\phi 3$, $\phi 4$, this absence signifying, when the motor is supplied, a failure of the electronics controlling the transistors T1, T2, T3, T4 (these control electronics being represented in FIG. 1 by a bow drawn in dashed line).

As mentioned above, the control electronics can be separate from the associated stepping motor or built into this stepping motor. The control electronics distributes the switching signals to the bases of the transistors T1, T2, T3, T4 in order to block or switch on these transistors selectively and sequentially. As seen above when examining the timing diagram of FIG. 2 where it appears that each phase is either fully supplied or not supplied at all, a simultaneous absence of supply in the four phases indicates a failure of the control electronics of this supply.

The device according to the invention responds to such a situation, detected by means of the diodes D1, D2, D3, D4 by causing the putting back into conduction of one of the phases in order to develop a torque for holding the rotor in the position reached at the instant of the failure. In order to provide this return to conduction, the device is provided with a fifth transistor T5 called the "holding" transistor, the emitter-collector circuit of this transistor being connected between the line at $-V_{BAT}$ and the terminal common to one of the phases and to -the transistor associated with this phase, this phase being able to be chosen arbitrarily from among the four available phases. In the device of FIG. 1, phase $\phi 4$ has been chosen. Still with reference to this device, the transistor T5 is of the NPN type and adjustment resistor R4 is connected to its collector for a purpose which will be described below.

In normal operation, at least one of the phases being supplied, for example phase $\phi 1$, the cathode potential of the diode D1 is equal to the collector-emitter voltage $V_{CESAT}$ of the transistor T1 which is then in the saturated state (in the order of about 1 volt) and the anode of the diode D1 is then at this potential plus the voltage drop of the junction of D1 (approximately 0.6 volts) giving approximately 1.6 volts. This potential, divided by the divider bridge R2, R3, establishes on the base of transistor T5 a voltage lower than the potential for switching on the transistor T5 which therefore remains off.

If none of the transistors are conducting, the cathodes of the diodes are taken to the potential $+V_{BAT}$ which appears again on the anodes of the diodes and the division of this voltage $+V_{BAT}$ by the bridge R2, R3, establishes on the base of transistor T5 a voltage higher than the voltage for switching the transistor T5 to the conducting state, which then allows the flow of a current in the phase $\phi 4$. This current can be adjusted by means of the resistor R4 such that the maximum holding torque $M_M$ established by the windings of this phase $\phi 4$, is greater than the maximum resisting torque $C_R$ which may be applied to the rotor of the motor, as shown in FIG. 3. As seen above, after detection of the failure of the control electronics by the diodes D1, D2, D3, D4, the rotor of the motor can no longer be displaced except for within a narrow angle having a maximum amplitude equal to two steps in absolute value, an essential objective of the present invention.

It will be noted that the set of diodes D1, D2, D3, D4 is such that it hard wires a logic "AND" function in that the switching on of transistor T5 is ensured only if all of the diodes are connected to phases in which no current is flowing.

For the purpose of regulating the current supplied to the motor, it may be necessary to supply the various phases of this motor using pulse width modulation (or PWM modulation). In this respect reference is made to the timing diagrams of FIG. 2 in which such a control has been shown in broken lines, applied to the transistor T2, by way of example, all of the phases being able to be controlled in this way. By modulating the cyclic ratio of a control of period T it is possible to adjust the average current during the steps B and C of the control of the transistor T2 to a predetermined value. The same applies to the conduction steps in the other phases. It is therefore necessary to filter the response of the detection means in order to prevent a simultaneous absence of current in the four phases, due to the PWM control of these phases, from triggering the conduction of transistor T5 while the control electronics is not subject to any failure. In order to do this (see FIG. 1), a capacitor C1 is connected between the base of T5 and the line at $-V_{BAT}$. This capacitor C1 constitutes, with the resistor R2, a filter whose time constant can be adjusted as a function, in particular, of the minimum cyclic ratio of the PWM control.

It will be noted that, when transistor T5 is conducting, the resistor R4 and the resistance of the phase $\phi 4$ create a voltage divider bridge. Depending on the value of the resistor R4, the voltage on the cathode of the diode D4 can therefore be sufficiently low to cause the cutting off of transistor T5, which causes the application of a voltage $+V_{BAT}$ to the cathode of the diode D4, and therefore the putting of transistor T5 into the conducting state at the end of a time related to the time constant of the filtering circuit R2, C1. In this way a chopped conduction of the phase $\phi 4$ is established, under the control of transistor T5, which is put into the conducting state, which can be satisfactory as it guarantees the flow of an average current in this phase related to the cyclic ratio of this chopped control and to the choice of the resistor R4, which allows the adjustment of the value of the holding torque due to the phase $\phi 4$.

However, this functioning may not be considered as satisfactory because the average torque thus obtained can be insufficient and because the functioning of transistor T5 in chopped mode can cause a heating up of the latter due to switching losses.

The embodiment of the device according to the invention shown in FIG. 4 allows the chopping of the current in the phase $\phi 4$ to be prevented, during the holding period. Identical references in FIGS. 1 and 4 relate to identical or similar elements or devices. The device in FIG. 4 is essentially distinguished from that shown in FIG. 1 in that it comprises a diode D5, forward connected between the terminal common to the resistor R4 and to the phase $\phi 4$ and the collector of the transistor T4, of the NPN type in the example shown, as are the other transistors T1, T2, T3. This diode T5 allows a distinction to be established between the control of the phase $\phi 4$ by transistor T5 in a holding period and the control of this phase by transistor T4 in normal operation. In effect, the phase $\phi 4$ can be controlled either by transistor T4 or by transistor T5. When the phase $\phi 4$ is controlled by transistor T4, the latter being saturated, the potential of the cathode of the diode D4 is close to 0 volts which imposes a 0 level at the output of the detection means (D1, D2, D3, D4) ensuring the cutting off of T5. If the phase $\phi 4$ is controlled by transistor T5, the potential of the cathode of the diode D4, because of the presence of the diode D5, is no longer dependent on the voltage present at the point common to the phase $\phi 4$ and the resistor R4 (anode of the diode D5). The anode potential of the diode D4 is then the same as that imposed by the diodes (D1, D2, D3) and therefore, if none of the phases $\phi 1$, $\phi 2$, or $\phi 3$, is controlled, the output level of this set of diodes is the 1 level, which ensures the holding of transistor T5 in the conducting state, whatever the anode potential of the diode D5 may be and therefore whatever the value of the resistor R4 may be.

It will be noted that the presence of the diode D5 introduces a slight imbalance in the supply of the phases of the motor in normal operation, because of the voltage drop in the diode D5, when transistor T4 is conducting. The voltage drop thus introduced (in the order of about 0.6 volts) is however sufficiently low not to seriously interfere with the functioning of the motor.

The embodiments of the device according to the invention shown in FIGS. 1 and 4 are designed to be sensitive to a failure of the control electronics as to the failure of the transistors T1, T2, T3, T4 themselves.

According to the invention, it is also possible to trigger the conduction of the holding transistor T5 only in the case of a failure of the control electronics, and not in the case of the failure of the power transistors T1, T2, T3, T4. In this way a permanent control of transistor T5 is ensured in the case of absence of control of the transistors (T1, T2, T3, T4). This prevents transistor T5 from functioning in chopped mode, without the use of a diode such as the diode D5 which has the effect of unbalancing the supply of the phase $\phi 4$ when the transistor T4 is conducting, as has been seen above. FIG. 5 shows a third embodiment of the device according to the invention which operates on this principle.

In FIGS. 1 and 5 a same reference is associated with an identical or similar element or device. The embodiment shown in FIG. 5 is essentially distinguished from that of FIG. 1 in that the diodes D1, D2, D3, D4 are connected in the forward direction between lines receiving logic signals $S_{L1}$, $S_{L2}$, $S_{L3}$, $S_{L4}$ and the base of a transistor T6. These signals control circuits $CB_1$, $CB_2$, $CB_3$, $CB_4$ which ensure, under the control of these signals, the blocking and switching on of the transistors T1, T2, T3, T4. The collector-emitter circuit of the transistor T6 is connected between the terminal common to the resistors R1 and R2 and the line $-V_{BAT}$. Polarisation resistors R5, R6 are connected between the base of transistor T6 and this line at $-V_{BAT}$ on the one hand, and between this base and the output of the detection means (D1, D2, D3, D4) on the other hand. These diode detection means which in fact carry out a logic function could of course be replaced by a logic circuit. It is understood that, in this embodiment, it is the simultaneous absence of the four signals $S_{L1}$, $S_{L2}$, $S_{L3}$, $S_{L4}$ which, by cutting off transistor T6, will cause the switching of the holding transistor T5 into the conducting state.

We claim:

1. Device for controlling the electrical power supply of a stepping motor having a rotor and a stator with a plurality of phases, comprising a plurality of switches each controlling a power supply from an electrical energy source to a respective phase of the stator, detecting means for detecting a simultaneous ceasing of conduction in all of the phases, and controlling means operatively connected to and excited by said detecting means, said controlling means causing conduction of one of the phases for holding the rotor with a predetermined holding torque established by the one phase.

2. Device according to claim 1, wherein said switches for controlling a power supply in the stepping motor are transistors each respectively associated with one of the phases, said controlling means for causing conduction of the one phase including a holding transistor having a base and an emitter-to-collector path connected in series with the one phase and in parallel with an emitter-to-collector path of the transistor controlling the power supply of the one phase, said detecting means being operatively associated with said base of said holding transistor for controlling said holding transistor.

3. Device according to claim 2, including a dividing bridge having an end terminal and a mid-point connected to said base of said holding transistor, said detecting means including a plurality of diodes each connected between an output of a phase of the stator and said end terminal of said dividing bridge, said plurality of diodes forming a hard-wired AND function logic gate for detecting a simultaneous absence of current in all of the phases and for establishing a voltage on said mid-point of said dividing bridge for turning on said holding transistor and supplying power to the one phase.

4. Device according to claim 3, wherein said dividing bridge includes two resistors connected in series, and a further resistor connected in series between said two resistors and an electrical energy source.

5. Device according to claim 4, including resistor means connected between said emitter-to-collector path of said holding transistor and the one phase for returning the one phase to a conducting state and for limiting a current in the one phase during the return to conduction of the one phase and for limiting a holding torque applied by the one phase to the rotor of the motor.

6. Device according to claim 5, wherein said resistor means are means for establishing a chopped supply for said holding transistor during a return to conduction of the one phase.

7. Device according to claim 2, including means for controlling said transistors in pulse width modulation.

8. Device according to claim 7, including a filtering circuit interposed between an output of said detecting means and said base of said holding transistor.

9. Device according to claim 2, wherein said detecting means include a plurality of diodes and a further diode forward connected between the one phase and a node common to one of said diodes associated with the one phase and to the emitter-to-collector path of the transistor associated with the one phase, said further diode being means for preventing a blocking of said holding transistor in an absence of a control current in at least one of the four phases of the motor.

10. Device according to claim 1, including a further transistor connected in between said detecting means and said holding transistor, said further transistor having a base, control signal means for providing respective control signals for said switches, said detecting means including a plurality of diodes respectively connected between said control signal means and said base of said further transistor, said further transistor being means for controlling said holding transistor such that a turning on of said holding transistor is due exclusively to a failure of said control signal means.

11. In a stepping motor having a rotor, a stator with a plurality of phases, and a plurality of switches each associated with a respective one of the phases for controlling electrical power supply to the phases, a device for controlling the stepping motor by controlling the electrical power supply of the stepping motor, comprising detecting means for detecting a simultaneous ceasing of conduction in all of the phases, and controlling means operatively connected to and excited by said detecting means, said controlling means causing conduction of one of the phases for holding the rotor with a predetermined holding torque established by the one phase.

12. Device according to claim 11, wherein said switches for controlling a power supply in the stepping motor are transistors each respectively associated with one of the phases, said controlling means for causing conduction of the one phase including a holding transistor having a base and an emitter-to-collector path connected in series with the one phase and in parallel with an emitter-to-collector path of the transistor controlling the power supply of the one phase, said detecting means being operatively associated with said base of said holding transistor for controlling said holding transistor.

13. Device according to claim 12, including a dividing bridge having an end terminal and a mid-point connected to said base of said holding transistor, said detecting means including a plurality of diodes each connected between an output of a phase of the stator and said end terminal of said dividing bridge, said plurality of diodes forming a hard-wired AND function logic gate for detecting a simultaneous absence of current in all of the phases and for establishing a voltage on said mid-point of said dividing bridge for turning on said holding transistor and supplying power to the one phase.

14. Device according to claim 13, wherein said dividing bridge includes two resistors connected in series, and a further resistor connected in series between said two resistors and an electrical energy source.

15. Device according to claim 12, wherein said detecting means include a plurality of diodes and a further diode forward connected between the one phase and a node common to one of said diodes associated with the one phase and to the emitter-to-collector path of the transistor associated with the one phase, said further diode being means for preventing a blocking of said holding transistor in an absence of a control current in at least one of the four phases of the motor.

* * * * *